United States Patent
Li et al.

(10) Patent No.: US 7,546,342 B2
(45) Date of Patent: Jun. 9, 2009

(54) DISTRIBUTED HOSTING OF WEB CONTENT USING PARTIAL REPLICATION

(75) Inventors: Jin Li, Sammamish, WA (US); Cha Zhang, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 10/845,625

(22) Filed: May 14, 2004

(65) Prior Publication Data

US 2005/0283537 A1 Dec. 22, 2005

(51) Int. Cl.
*G06F 15/16* (2006.01)

(52) U.S. Cl. .................. 709/203; 709/240; 709/219; 709/241; 707/100

(58) Field of Classification Search .............. 709/240, 709/203, 219, 241; 707/100
See application file for complete search history.

(56) References Cited

U.S. PATENT DOCUMENTS

| | | | | |
|---|---|---|---|---|
| 6,718,365 B1* | 4/2004 | Dutta | | 709/203 |
| 6,970,987 B1* | 11/2005 | Ji et al. | | 711/162 |
| 7,036,138 B1* | 4/2006 | Tash | | 725/46 |
| 7,171,687 B2* | 1/2007 | Uemura | | 726/18 |
| 7,277,950 B1* | 10/2007 | Chapweske | | 709/227 |
| 7,313,616 B1* | 12/2007 | Carroll et al. | | 709/224 |
| 7,359,985 B2* | 4/2008 | Grove et al. | | 709/238 |
| 7,379,974 B2* | 5/2008 | Hetzler et al. | | 709/217 |
| 7,424,514 B2* | 9/2008 | Noble et al. | | 709/205 |
| 2002/0040389 A1* | 4/2002 | Gerba et al. | | 709/219 |
| 2002/0087797 A1* | 7/2002 | Adrangi | | 711/133 |
| 2003/0005465 A1* | 1/2003 | Connelly | | 725/119 |
| 2003/0204613 A1* | 10/2003 | Hudson et al. | | 709/231 |
| 2003/0208621 A1* | 11/2003 | Bowman | | 709/242 |
| 2005/0015511 A1* | 1/2005 | Izmailov et al. | | 709/238 |
| 2005/0086300 A1* | 4/2005 | Yeager et al. | | 709/204 |
| 2005/0160107 A1* | 7/2005 | Liang | | 707/100 |
| 2006/0149836 A1* | 7/2006 | Robertson et al. | | 709/224 |
| 2007/0050522 A1* | 3/2007 | Grove et al. | | 709/246 |
| 2008/0034273 A1* | 2/2008 | Luby | | 714/776 |
| 2008/0201415 A1* | 8/2008 | Herley | | 709/203 |

OTHER PUBLICATIONS

Bayardo, Jr., R. et al., "YouServ: A Web-Hosting and Content Sharing Tool for the Masses", Proceedings of the International World Wide Web Conference, pp. 345-354, May 2002.

(Continued)

*Primary Examiner*—Alina N. Boutah
(74) *Attorney, Agent, or Firm*—Lee & Hayes, PLLC

(57) ABSTRACT

The mechanisms described herein are directed at hosting content of a web site on multiple computing devices. A relative importance for each file associated with the web site is calculated. This relative importance is used to calculate several subsets of the content which are distributed to several devices within a computer cluster, such as a server array, peer-to-peer network, and the like. The subsets may include coded messages created using an erasure coding scheme on packets containing portions of one or more files. Upon retrieving a file, a fixed number of distinct coded messages are retrieved from the devices based on the erasure coding scheme. The file is re-created with these distinct messages. Because multiple devices hold the content, the web site may be retrieved significantly faster and the reliability is increased without consuming a large amount of storage space or bandwidth of any one computing device.

15 Claims, 9 Drawing Sheets

OTHER PUBLICATIONS

Ratnasamy, S., et al., "Routing Algorithms for DHTs: Some Open Questions", IPTPS '02, pp. 45-52, 2002.

Ngan, et al., "Enforcing Fair Sharing of Peer-to-Peer Resources", IPTPS '03, pp. 149-159, 2003.

Cardellini, V., et al. "The state of the art in locally distributed web-server systems", ACM Computing Surveys, vol. 34, No. 2, pp. 263-311, Sep. 2002.

R. Dingledine, M. Freedman, and D. Molnar, "Peer-to-Peer: Harnessing the Benefits of a Disruptive Technology," 2001, pp. 159-187, O'Reilly & Associates, Inc., Sebastopol, CA, US.

Petar Maymounkov et al., "Kademlia: A Peer-to-Peer Information System Based on the XOR Metric", IPTPS 2002, pp. 52-65, Jul. 2002.

* cited by examiner

DISTRIBUTED HOSTING OF WEB CONTENT USING PARTIAL REPLICATION

TECHNICAL FIELD

This document generally relates to the hosting of web content, and more particularly, to the hosting of web content in a computer cluster.

BACKGROUND

The amount of information that is readily available on the Internet has increased significantly over the past several years. Until recently, most information was provided by corporate websites. However, today, many individual users are publishing information as personal web pages. These personal web pages may contain a variety of web content, such as diaries, weblogs (commonly referred to as blogs), personal photo/video collections, personal advice, personal experiences, and the like. While the Internet provides a great avenue for publishing this web content, there are many obstacles that impact the individual user's ability to publish web content.

In general, individual content owners have two options for hosting their web content: (1) hosting on a commercial data center; or (2) hosting on their own personal computer using their own internet link. The commercial data center option provides reliable server and bandwidth link. Nevertheless, there are several short comings. For example, the owners have to pay an additional fee for the host service. They are limited in the amount of content that they can host on the data center. They are also limited in the amount of daily and monthly traffic allowed through the data center. They may not have access to their favorite applications or tools because the data center may not support theses applications or tools. In addition, the computation power and network bandwidth allocated to serve an individual user's request may be limited because the powerful server and high bandwidth link is shared among a large number of people that utilize the data center.

Alternatively, option 2 above, the content owners may host the web content on their own computer. Using one's own computer to host the web content avoids the additional fee, gives the owner virtually unlimited amount of hosting space (only limited by the size of the hard drive used), and bestows the owner with the freedom to choose any application/database. Nevertheless, there are obstacles. One obstacle is the unreliable and insufficient nature of delivering the web content to other users. In order to provide continuous access to the web content, the owner's home computer and internet connection must be running and working all the time. If the home computer experiences a failure or the computer is inadvertently powered off, it will not be able to provide the content. In addition, if the owner's connection to the Internet goes down, the owner again will not be able to provide the content. Even if it is possible to ensure that the computer and Internet connection never go down, there are still other obstacles to overcome, such as having sufficient bandwidth. It is not uncommon for Internet Service Providers (ISPs) to limit the upload speeds of the Internet connection from the user's home computer. These upload speeds are rarely sufficient to quickly deliver the web content to the other users. For example, even with a broadband connection, the upload speeds are usually limited to 128 Kbps, which does not provide adequate bandwidth to support the web content access request.

Corporate entities that publish web content can overcome these obstacles by investing in expensive server arrays and faster Internet connection. These options, however, are expensive and are not available to most individual users. Fortunately, an alternative cost effective solution has arisen for certain types of web content. This alternative solution is building a peer-to-peer (P2P) network. Examples of P2P consumer applications include "NAPSTER", "KAZAA", and gnutella. Each of these P2P consumer applications focus on sharing files among multiple computers. While sharing files may appear to be similar to sharing web sites, the sharing of web sites present unique challenges.

One challenge is the quantity of information that must be shared. The web site has multiple web pages, with each web page consisting of a collection of files. The entire collection of files must be readily available when an associated hyperlink is selected on one of the web pages. Thus, sharing a web site requires more storage space and consumes larger bandwidths than sharing a single file. Another challenge is the retrieval speeds and response time for serving the collection of files. Current P2P consumer applications allow the retrieval of the one file to be performed quite slowly, such as over several hours or even days. In addition, the retrieval can be scheduled for a time when the network is not as busy or as soon as the computer holding the content comes online. This slow retrieval speed is unacceptable when retrieving web pages because the requesting client is unlikely to wait for hours to view the web pages or wait for the computer to come online.

To overcome these challenges, there have been some attempts at replicating the web content on multiple computers. Then, when the content is accessed by a client, the content may be either accessed from the owner's home computer or from one of the other computers hosting the entire content. Having the web content replicated on multiple computers increases the reliability of the web content, because it is less likely that all the computers and their associated network links will be down at the same time. However, the serving bandwidth of the content remains the same because the entire content is still retrieved from one computer and its associated network connection. While this type of system does increase the reliability of accessing the web pages, the systems still require a large amount of storage capacity for storing the entire content and require a large amount of bandwidth for distributing the entire content. Thus, until now, there has not been a satisfactory solution for publishing web content that is suitable for use by the general public.

SUMMARY

The techniques and mechanisms described herein are directed at hosting content of a web site on multiple computing devices using partial replication. A relative importance for each file associated with the web site is calculated. This relative importance is used to calculate several subsets of the content which are distributed to several devices within a computer cluster, such as a server array, peer-to-peer network, and the like. The subsets may include coded messages created using an erasure coding scheme on packets containing portions of one or more files. Upon retrieving a file, a fixed number of distinct packets are retrieved from the devices based on the erasure coding scheme. The file is re-created with these distinct packets. Because multiple devices hold the content, the web site may be retrieved significantly faster and the reliability is increased without consuming a large amount of storage space or bandwidth of any one computing device.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present web hosting mechanism supports retrieval of web content from several computing devices within a computer cluster wherein each computing device stores a subset of the web content. The present web hosting mechanism also supports the distribution of the web content into the several subsets that are stored on the multiple computing devices within the computer cluster. As will be described in detail below, the distribution method minimizes the amount of storage space needed when replicating the web content. In addition, the distribution and retrieval methods improve the reliability and access time to the web content. These and other advantages will become clear after reading the following detailed description.

Figure 1:
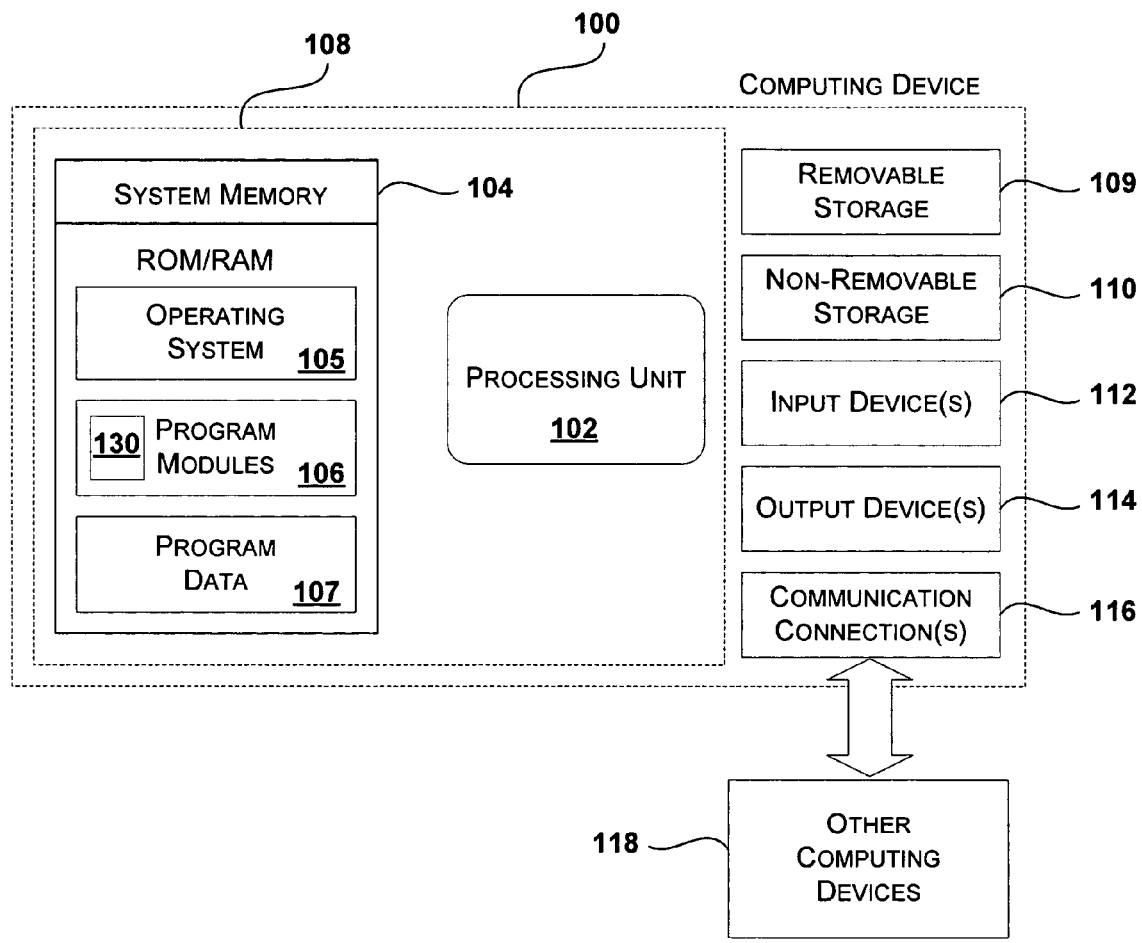
FIG. 1 is an illustrative computing device that may be used to implement the techniques and mechanisms described herein.

FIG. 1 illustrates one exemplary system for implementing the present web hosting mechanism. The system includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The program modules 106 include modules 130 for implementing the present web hosting mechanism which distributes and retrieves content from multiple computing devices. In addition, system memory 104 includes a browser for locating and displaying web pages. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media can be any available media that can be accessed by a computer. By way of example, and not limitation, computer readable media may comprise "computer storage media" and "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 2:
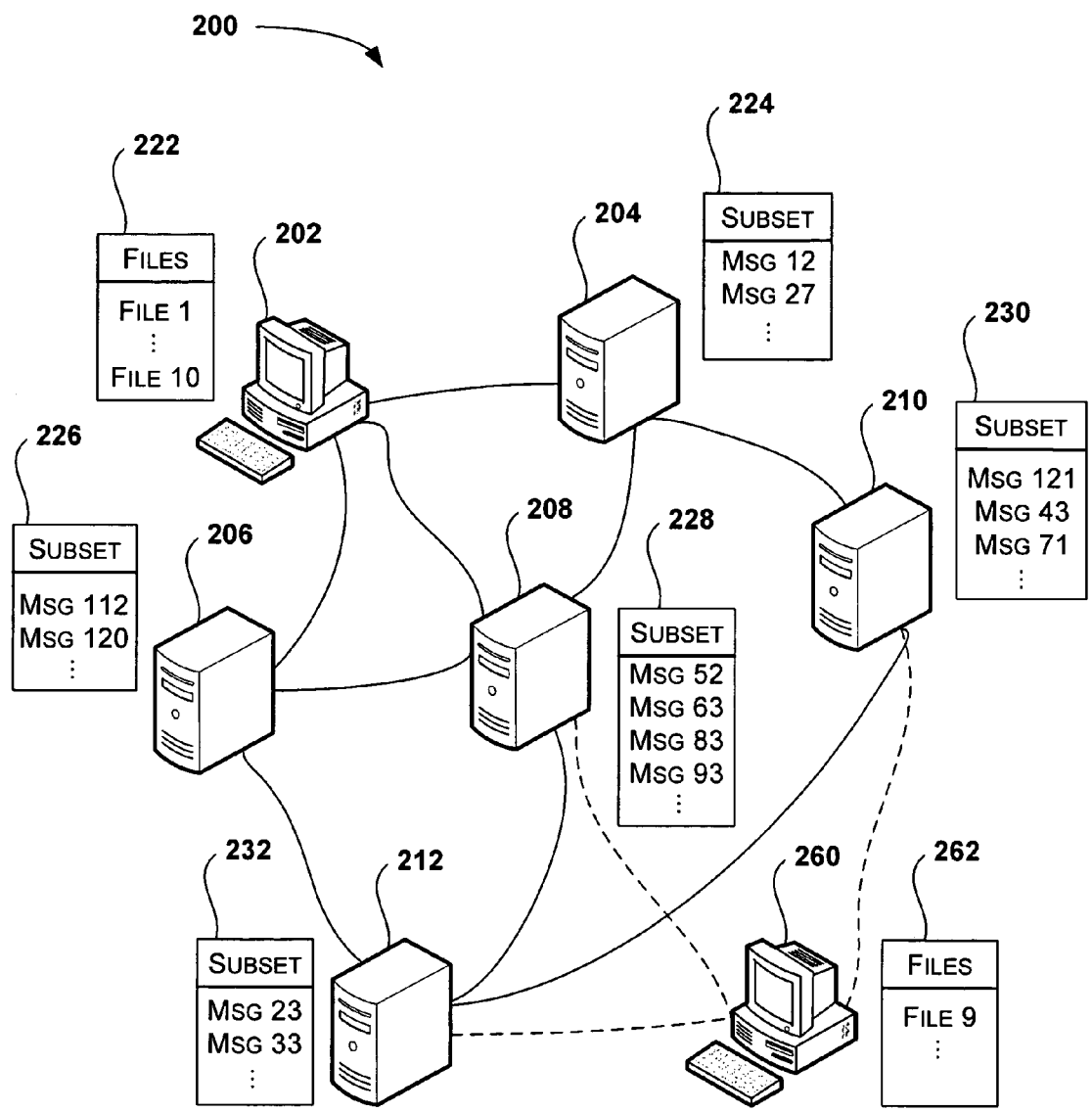
FIG. 2 is an illustrative network in which two or more computer devices shown in FIG. 2 are arranged to implement the distributed web hosting mechanism described herein.

FIG. 2 is an illustrative network in which two or more computing devices, such as computing device 100 shown in FIG. 1, are arranged to implement the techniques and mechanisms of the present distributed web hosting mechanism. The network may be referred to as a computer cluster 200. In one embodiment, the computer cluster 200 may be configured as a server array. In another embodiment, the computer cluster 200 may be configured using a peer-to-peer (P2P) network. In general, the computer cluster 200 includes multiple computing devices 202-212. Each computing device 202-212 is configured to communicate with one or more of the other computing devices 202-212. The communication paths are represented in FIG. 2 by solid lines between two of the computing devices 202-212. The communication paths may be via a local area network, internet, wireless, and the like. One of the computing devices (e.g., computing device 202) holds the original web content (e.g., web content 222). Throughout the following discussion, computing device 202 will be referred to as host computer 202. The other computing devices (e.g., computing devices 204-212) each hold a subset (e.g., subsets 224-232) of web content 222. Because the other computing devices 204-212 hold a subset of the host computer's web content, computing devices 204-212 are referred to as peers 204-212 of host computer 202 throughout the following discussion. It is important to note that the use of the term peer does not require computer cluster 200 to be configured as a peer-to-peer network. Rather, the term peer reflects that the peer holds content for another computing device.

As an overview, host computer 202 wants to delivery the web content 222 to one or more computing devices, such as a client computing device 260 (hereinafter referred to as client 260). One will note that client 260 is not shown as part of the computer cluster 200. While this is the typical configuration, the present distributed web hosting mechanism will work equally as well if the client 260 is a part of the computer cluster 200. In either configuration, client 260 may access the subsets on the peers via the Internet using well known techniques, in conjunction with the present distributed web hosting mechanism described below. Prior implementations for publishing personal content have the client 260 either obtaining the entire web content 203 from host computer 202 or from another computing device that had replicated the entire web content 222. However, as explained above, these implementations consume a considerable amount of storage space and utilize only the bandwidth of the host 202 or the other computing device. Therefore, the present distributed web hosting mechanism focuses on replicating a subset 224-232 of the web content 222 on each of the peers 204-212. Each subset 224-232 may include a different set of content 222. Because peers 204-212 do not store the entire web content 222, client 260 obtains the entire web content 222 from multiple peers (e.g., peers 208-212) in accordance with the present distributed web hosting mechanism.

Figure 3:
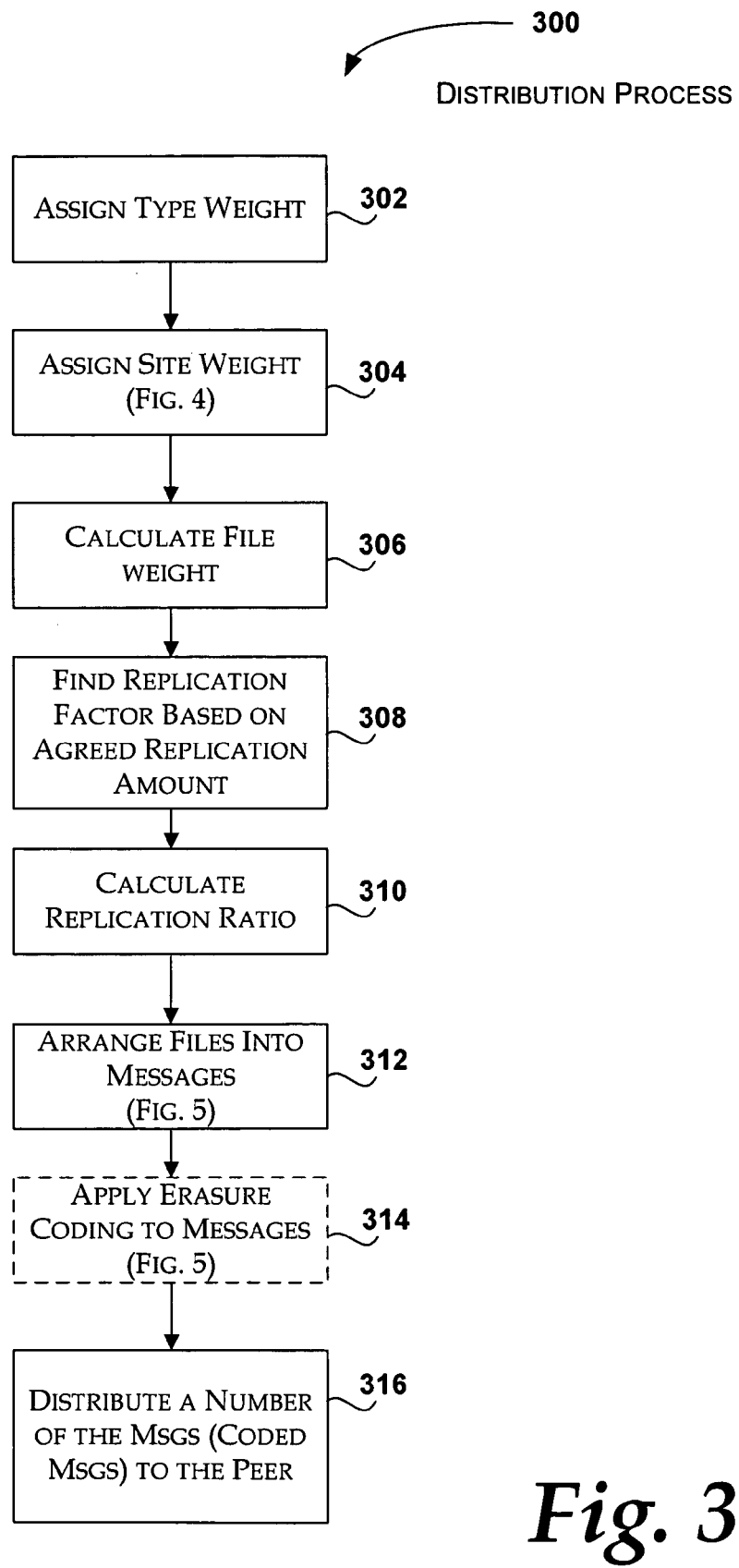
FIG. 3 is a flow diagram that illustrates a distribution process for distributing a subset of the replicated web content to one of the multiple computing devices shown in FIG. 2.

The mechanism for determining the subsets of web content 222 and the distribution of these subsets 224-232 to the peers 204-212 is illustrated in flow diagram 300 that is shown in FIG. 3. In overview, the distribution process 300 determines which subsets of the content should be duplicated on various peers. Because the entire content is not distributed to each of the peers, the storage cost for the peers is minimized and the cost/time associated with distributing the subsets to the peers is minimized.

At block 302, a type weight is assigned for each file within a web site hierarchy. The web content may include several types of content, such as text, pictures, video, and the like. The several types of content may each have different attributes associated with their type of content. In accordance with the present distributed web hosting mechanism, each type of content is assigned a certain weight (i.e., a type weight). The type weight reflects the importance of that type of content in relation to other types of content. In one embodiment, a higher weight indicates a desire to ensure that the content of this type is not missing when any of the web pages having this type of content are retrieved. For example, having icons appear on the web page may be less important than having text appear on the web page. Thus, the type weight assigned to icon content may be lower than the type weight assigned to text content. In one embodiment, a user may assign the type weight for each individual type of content. For example, the user may assign a type weight for each type of file extension. The distribution process will then assign the specified type weight for the content once the file extension is recognized. In another embodiment, a default type weight setting may be set for the different types of content. The user can then override the default setting. Processing continues at block 304.

At block 304, a site weight is assigned for each file within a web site hierarchy. In general, any web site can be organized into topics, such as by interest, by time/event, and the like. Files associated with a particular web page may be organized on the storage media by placing them in directories. Therefore, the web site hierarchy may be graphically illustrated as a hierarchical directory tree, such as shown in FIG. 4.

Figure 4:
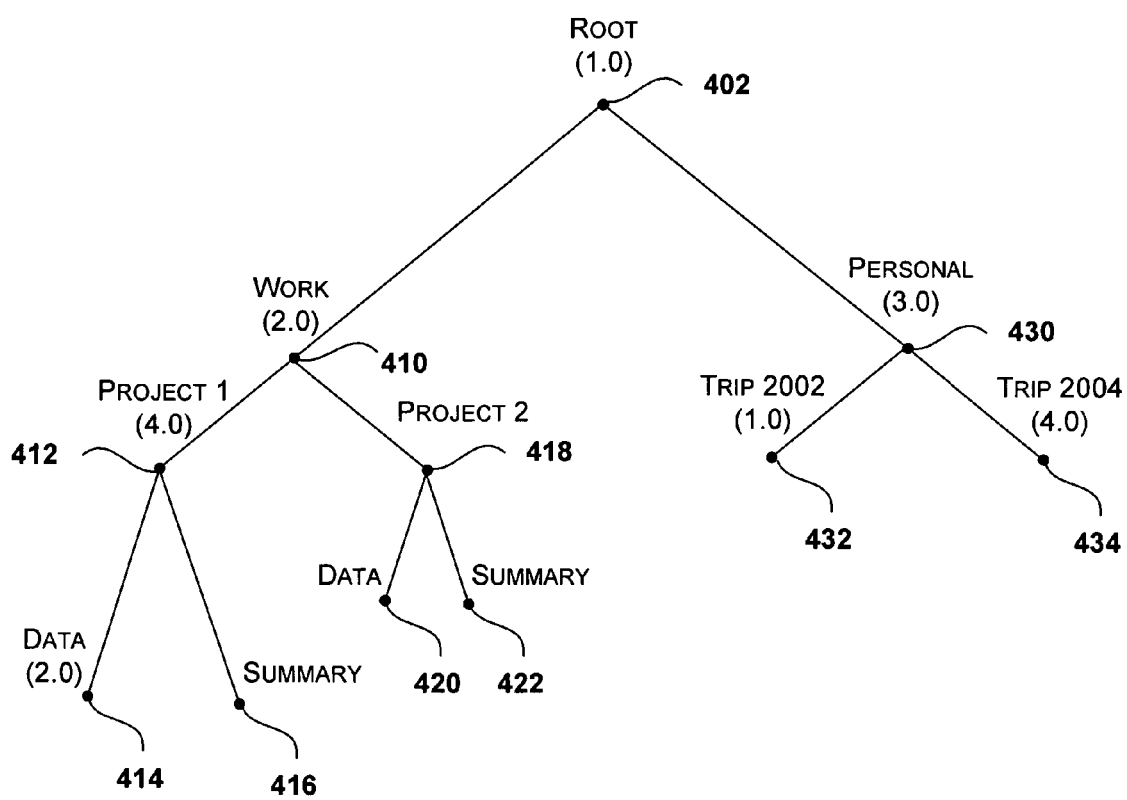
FIG. 4 is a graphical tree illustrating the assignment of site weights to the web content suitable for use in the distribution process shown in FIG. 3.

In FIG. 4, the exemplary web site hierarchy includes a root directory 402 having two sub-directories: work directory 410 and personal directory 430. Both of these sub-directories also have sub-directories. Work directory 410 has a project 1 sub-directory 412 and a project 2 sub-directory 418. Both project 1 and project 2 have two sub-directories: data 414 and 420 and summary 416 and 422, respectively. Personal directory 420 has two sub-directories: trip 2002 432 and trip 2004 434. While the actual layout for the web site hierarchy is not particularly interesting, one will note that each directory has an associated site weight associated with the directory. The site weight for the directories may be assigned by the owner of the web site hierarchy to reflect the relative importance between the various directories within the web site. The relative importance between the directories reflects the different levels of annoyance that persons viewing the web site would experience if certain content was missing. The relative importance also reflects that certain content is more likely to be visited than other content. For example, recently created web pages will more likely be visited than older web pages.

The assigning of the site weight may be achieved by providing a graphical web site hierarchy, such as shown in FIG. 4, and allowing the user to select each directory or file and assign a site weight. In order to reduce the process of assigning site weights, a site weight may be assigned to just a few directories. The unassigned directories may then inherit their own site weight from their parent directory. Thus, if a directory or file does not have its own site weight assigned, that directory or file may inherit the site weight from its parent. For example, work directory 410 is assigned a site weight of 2.0. Project2 directory and its sub-directories are not assigned any specific site weight. Thus, project2 418, data 420, and summary 422 inherit the site weight of 2.0 from the work directory 410. In another embodiment, the site weight may be listed in a file. These and other variations for assigning the site weight allow the present distributed web hosting mechanism access to the site weight. Once the site weights and type weights have been assigned, processing continues at block 306 in FIG. 3.

At block 306, a file weight FW is calculated for each file within the website hierarchy. In general, as will be shown below, the file weight FW will affect the calculation of a replication ratio $w_{m,i}$ for the associated file m. The replication ratio $w_{m,i}$ determines how often the content (e.g., the file) is replicated on the peers. Thus, the replication ratio $w_{m,i}$ affects the retrieval reliability for the particular file m. The file weight FW of the file m is calculated by multiplying the file's site weight S with the type weight W as shown in the equation below:

$$FW_m = S_m \times T_m, \quad \text{(eq. 1)}$$

where m represents the mth file in the web site. In general, as will be shown below, doubling the file weight FW results in the doubling of the content replication ratio, which causes the resultant file to be retrieved with twice the serving bandwidth and retrieval reliability. Once an individual file weight FW is calculated for each file m within the website hierarchy, processing continues at block 308.

At block 308, a relative peer replication factor λ is determined for the peer (e.g., peers 204-212 shown in FIG. 2). The relative peer replication factor λ is based on an agreed replication amount D that the peer agreed to store for the host computing device. The relative peer replication factor λ may be determined by solving the following equation for the relative peer replication factor λ:

$$D(\lambda_i) = \sum_m |Pm| \max\{1, FW_m \times \lambda_i\}, \quad \text{(eq. 2)}$$

where $D(\lambda_i)$ represents the total amount of content to be replicated to peer i; $\lambda_i$ represents the relative peer replication factor that is calculated for peer i; $FW_m$ represents the file weight for the mth file in the web site; and $P_m$ represents the file size of the mth file in the web site. Thus, because the total amount of content $D(\lambda_i)$ to be replicated to peer i is an agreed amount and the file sizes and file weights are known for each file within the web site, the relative peer replication factor $\lambda_i$ may be determined.

One method for determining the relative peer replication factor is by performing a bi-sectional search. The bi-sectional search is successful because the above equation is a monotonically increasing function with the increase of the relative peer replication factor λ. The agreed replication amount may be negotiated with each peer. For example, the agreed replication amount may represent a mutual agreement by the host computer that the host computer will reciprocate the replication of the agreed amount on the host computer to support replication of the peer's web site. One will note that the replication factor λ depends on the storage agreement with the peer, i.e., D (see eqn 2). There is no constraint that all the peer's agreed amounts equal at least the storage size needed for the entire web site. In fact, in accordance with the present hosting mechanism, any amount of replicated data stored by the peers improves the reliability and retrieval speed. Moreover, even with a smaller replication factor λ, certain files having a large file weight $FW_m$ may be extensively duplicated, which improves the reliability and retrieval speed of those files. Once the peer replication factor for the individual peer is determined, processing continues at block 310.

At block 310, the peer replication ratio of each file within the web site is calculated in order to determine the content that is sent to the peer for replication. The peer replication ratio of each file is calculated using the following equation:

$$w_{m,i} = \max\{1, FW_m \times \lambda_i\}, \quad \text{(eq. 3)}$$

where $w_{m,i}$ represents the peer replication ratio of the mth file for peer i; $\lambda_i$ represents the relative peer replication factor that is calculated for peer i; and $FW_m$ represents the file weight for the mth file in the web site. The peer replication ratio $w_{m,i}$ can be viewed as the amount of the content related to the mth file sent to peer i in proportional to the size of the mth file $|P_m|$. Once the peer replication rate is determined, processing continues at block 312.

Figure 5:
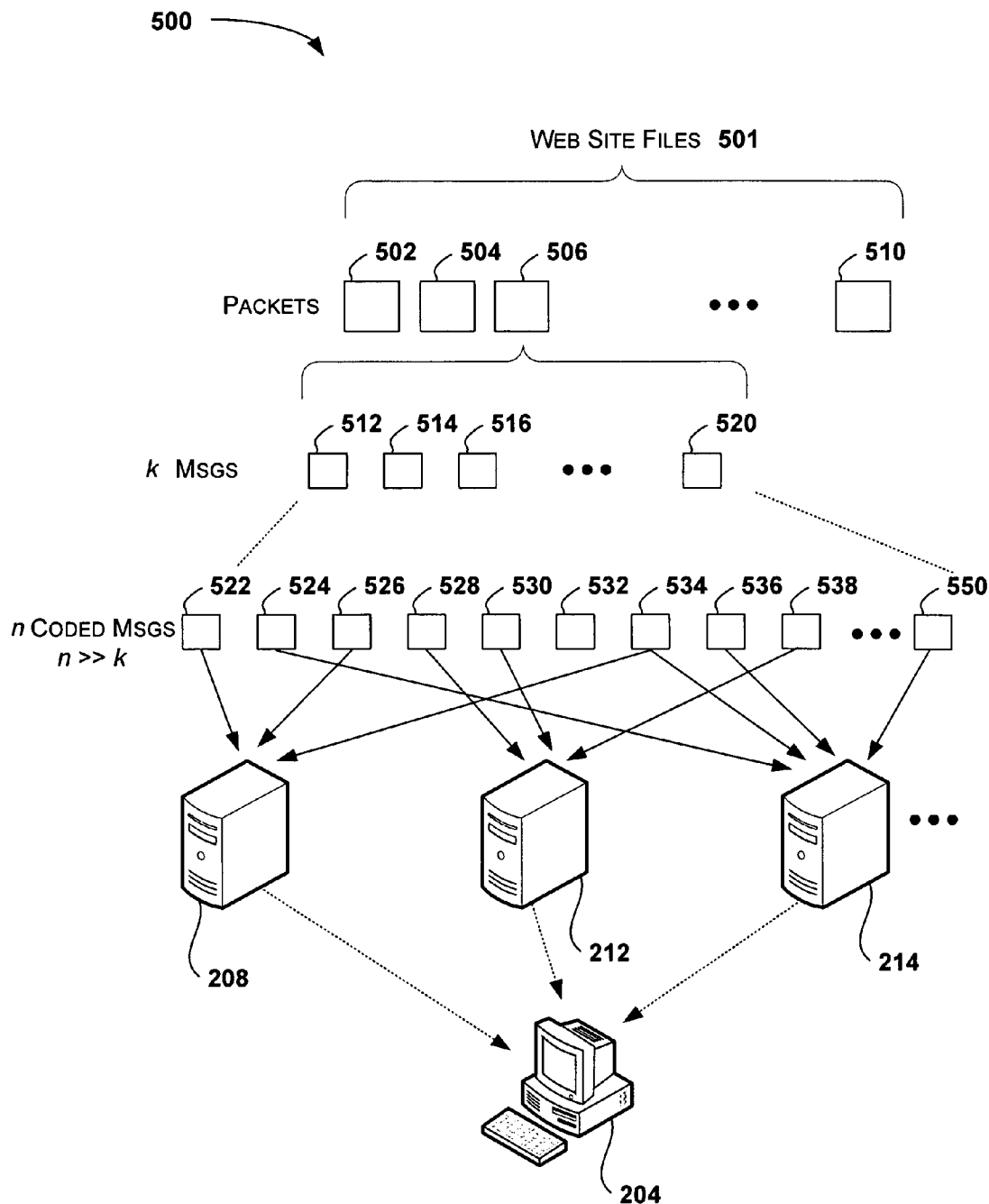
FIG. 5 is a block diagram graphically illustrating the conversion of the web files into messages suitable for use in the distribution process shown in FIG. 3.

At block 312, the files are arranged into messages. Turning briefly to FIG. 5, the creation of these messages is described. As mentioned earlier, a web site is a collection of web pages. Each web page includes several files (i.e., web files 501). These web files 501 are arranged into a number of packets (e.g., packets 502-510). For example, a large file may be split into multiple packets or several small files may be combined into one packet. In one embodiment, these packets 502-510 are a fixed size to aid in data manipulation. However, in this embodiment, it is important to note that some of the packets may not be the fixed size. For example, this may occur when splitting a large file into multiple packets. The last packet may be smaller than the other packets. In general, for this embodiment, the majority of packets are the fixed size. Each of these packets may be further split into k messages (e.g., messages 512-520). Again, these k messages may be fixed in size. One will note that one message (e.g., message 512) may have a portion of one original web site file or may have portions of several web site files depending on the content of the original packet 506. Processing continues at block 316 in FIG. 3.

Referring back to FIG. 3, at block 316, a number of these k messages are distributed to the peer. It is advantageous to distribute the messages when the traffic on the connection between the host computer and peer i is minimal. In one embodiment, a random number of the k messages are sent to peer i. The random number of messages may be proportional to the peer replication ratio $w_{m,i}$ calculated for peer i for the mth file. As an example, if a packet A is split into 16 messages, and the peer replication ratio for the file associated with packet A for peer Z is 0.5, half of these 16 messages (i.e., 8 messages) are sent to peer Z. In overview, described in detail below in conjunction with FIG. 6, at the time of retrieval, a client locates each of the 16 messages from one or more of the peers in the computer cluster in order to recreate packet A. This embodiment has short comings. Even if a large number of messages are distributed to several peers, at the time the client sends a request for packet A, the computer cluster may not have each specific message associated with packet A available. If this occurs, packet A, as well as the file that contains packet A, is irretrievable. One method for increasing the chances of recreating each packet is by performing erasure coding on the messages prior to distribution. Thus, block 314 may be performed prior to block 316.

At block 314, erasure coding may optionally be performed on the messages. As will be shown below, applying erasure coding in conjunction with file weights further increases the reliability and retrieval speed of the web content. Referring again to FIG. 5, messages 512-520 are processed using a well known mathematical tool called erasure coding. While erasure coding is well known for coding data, its application to web site content has not been previously envisioned. In overview, messages 512-520 are processed through an (n, k) erasure codec to form an erasure coding space of n coded messages (e.g., coded messages 522-550). There are several well known erasure coding technologies that may be used, such as Reed-Solomon erasure codes, tornado codes, and LPDC codes.

As a message error correction code, the operation of the (n, k) erasure resilient code can be described through a matrix multiplication over the Galois Field GF(p):

$$\begin{bmatrix} c_0 \\ c_1 \\ M \\ M \\ c_{n-1} \end{bmatrix} = G \begin{bmatrix} x_0 \\ x_1 \\ M \\ M \\ x_{k-1} \end{bmatrix}, \quad \text{(eq. 4)}$$

where p is the order of the Galois Field, $\{x_O, x_1, \ldots, x_{k-1}\}$ are the original messages, $\{c_0, c_1, \ldots, c_{n-1}\}$ are the coded messages, G is the generator matrix. In one embodiment, the coded messages are not all generated at the same time. Rather, the present hosting mechanism utilizes the generator matrix G to define a coded message space. When the client receives k coded messages $\{c'_0, c'_1, \ldots, c'_{k-1}\}$, these k coded messages may be represented as:

$$\begin{bmatrix} c'_0 \\ c'_1 \\ M \\ c'_{k-1} \end{bmatrix} = G_k \begin{bmatrix} x_0 \\ x_1 \\ M \\ x_{k-1} \end{bmatrix}, \quad \text{(eq. 5)}$$

where $G_k$ is a sub-generator matrix formed by the k rows of the generator matrix G that correspond to the coded messages. If the sub-generator matrix $G_k$ has full rank k, the matrix $G_k$ can be inversed, and thus, the original messages can be decoded.

Each erasure coding technology has its own unique advantages. For example, the Reed-Solomon codes have a maximum distance separable (MDS) property which guarantees decoding as long as k distinct coded messages are retrieved. Because the primary form of errors in web hosting applications is the loss of coded messages caused by the drop of connection or loss of packets during network transmission, the Reed-Solomon codes are particularly well-suited for the present distributed web hosting mechanism. For further details on the Reed-Solomon Codes, one is invited to review a book entitled "Reed-Solomon Codes and their applications", by S. B. Wicker and V. K. Bhargava, IEEE Press, New York, 1994.

The parameter k of the erasure codes determines both the granularity of the packet as well as the size of the erasure coding space. Because the original packets 502-510 are each broken into k equal sized messages, the larger the value of parameter k, the larger the number of messages 512-520 that results from each packet. This leads to an increase of both the granularity of the access and the overhead of the erasure coding. On the other hand, k governs the maximum number of peers that the content can be simultaneously retrieved by the user. Therefore, it is beneficial to select a moderate size k in order to ensure that the user can retrieve content from a large number of peers for the greatest possible increase in speed. The parameter n determines the number of coded messages that can be generated from the erasure codes. A sufficiently large value for n ensures that the different peers may hold different coded messages. An illustrative set of parameters is k=16 and n=$2^k$=65536. With this set of parameters, 4096 (65536/16) peers may be accommodated.

Referring back to FIG. 3 at block 316, subsets of these coded messages 522-550 are then distributed to the peers, instead of the original messages. When erasure coding is applied, at block 314, each peer receives a number Z of distinct coded messages out of the n coded messages in the erasure coding space. The number Z is based on the peer replication ratio $W_{m,i}$ calculated for the mth file and peer i as follows:

$$Z_i = W_{m,i} \times k, \quad \text{(eq. 6)}$$

where $Z_i$ represents the distinct number of coded messages and $W_{m,i}$ represents the peer replication ratio for the mth file and peer i. For example, a peer that has a replication ratio of 0.5, means that the peer should receive a number of coded messages that equals half the number of original messages for the packet (i.e., 50% duplication rate). The number of distinct coded messages $Z_i$ may be a factional value. When this occurs, $Z_i$ is simply interpreted as being $\lfloor Z_i \rfloor$ with probability $(1+\lfloor Z_i \rfloor - Z_i)$, and being $\lfloor Z_i \rfloor + 1$ with probability $(Z_i - \lfloor Z_i \rfloor)$, where $\lfloor x \rfloor$ is the floor function. Thus, with this probability alignment some peers will have one more coded message and other peers will not have the extra coded message. In order to ensure that the coded messages that are distributed to the peers are unique, a different erasure coding key may be assigned to each peer. The erasure coding key may be derived from the row index of the matrix associated with the erasure code. The aggregated content replication ratio of file $P_m$ is denoted as $C_m$, which is the total amount of copies of the file $P_m$ replicated in the computer cluster as follows:

$$C_m = \sum_i W_{m,i}. \quad \text{(eq. 7)}$$

With these subsets of web site content distributed to the peers, a client may initiate a request that results in the finding of k distinct coded messages.

Figure 6:
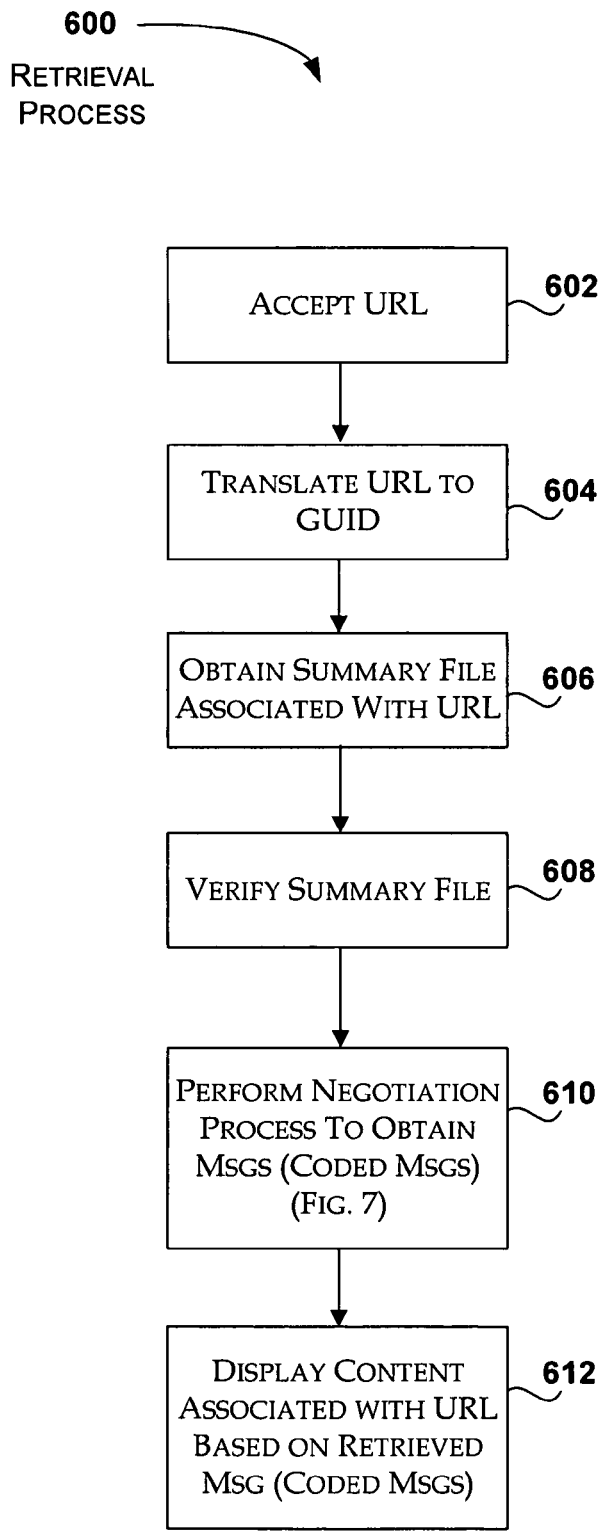
FIG. 6 is a flow diagram that illustrates a retrieval process for retrieving a subset of the web content from one of the multiple computing devices shown in FIG. 2.

FIG. 6 is a flow diagram that illustrates a retrieval process 600 for retrieving the missing items from one or more of the peers. The missing items may be the actual web site file, a packet, a message, or a coded message. In general, because each web page is retrieved from multiple peers, throughput for retrieving the web page is increased. In addition, the reliability of obtaining the requested web page is improved because the desired content may be obtained from multiple computers (i.e., peers). The general principal during retrieval is to retrieve the original number (i.e. k) of items (e.g., messages, coded messages) from any number of peers for each packet. The retrieved items can then be combined to recreate the original packets, which are combined to create the original web file. If the item is a coded message, the coded messages are erasure decoded to obtain the original messages, which are then combined as described above. For an individual packet, as long as the number of distinct messages stored by all the peers online is larger than the number (i.e. k) of original messages for that packet, the packet can be retrieved. Each original web file can be recovered if the constituent packets are retrievable. Thus, without erasure coding, each of the original messages are retrieved to recreate the packet. However, with erasure coding, only k distinct coded messages are retrieved to recreate the packet, where k is the number of original messages. As mentioned above, when erasure coding is applied using the Reed-Solomon codecs and parameter k is set at 16, 16 distinct coded messages will allow recovery of the original packet.

The retrieval process 600 begins when a browser sends out a request. Within the request, a host is identified, along with a relative address under the host. For example, a typical request may appear as follows: <dweb>www.xyz.com. As shown, a tag, such as <dweb> or the like, may appear along with the host address. The tag will indicate that the host address that follows is a distributed web site. Without such a tag, the program that receives the browser request may not be able to distinguish a distributed web site from a normal web site hosted by a single server. In one implementation, the program is implemented as a proxy. In this implementation, the program communicates with the peers via a proxy port. However, the program may be implemented in other configurations without departing from the spirit of the present distributed web hosting mechanism. For example, the program may be a component (e.g., toolbar) within the browser that is installed along with other browser components. It may also be implemented as an optional retrieval block of the browser. For any configuration, the retrieval process performed by the program is described in detail in conjunction with the flow chart illustrated in FIG. 6.

Thus, at block 602, a uniform resource locator (URL) is accepted, such as www.xyz.com/personal/trip2004/picture1.jpg. The URL is recognized as having distributed web content. Processing continues at block 604.

At block 604, a list of peers that hold portions of the web content associated with the URL is obtained. The URL is translated into a large integer value, such as a global unifier identifier (GUID). The list of peers holding the URL is the list of peers associated with the GUID. In one embodiment, determining the list of peers is achieved by checking a local GUID table that has one column that specifies a root path and a second column that specifies the GUID. This local GUID table may be created and updated whenever the client accesses a distributed web site. The GUID table list is then transmitted through out the computer cluster to obtain a list of computers that are storing portions of the web content. In an alternative embodiment, the list of peers that hold the GUID is determined by performing a look up using a distributed hash table (DHT) approach. The DHT technique for identifying peers that are associated with a GUID is well known in the art. Processing continues at block 606.

At block 606, a summary file associated with the URL is obtained. In general, there is a summary file for each directory of the hierarchical web site. In short, the summary file provides a glimpse of the structure of the web site. Using the summary file, the client can determine the number and the indexes of the packets that constitute the web page/files, and thus retrieve the right packets for the desired web page/file. In order to retrieve the requested file, the summary file associated with the directory in which the requested file is located is obtained. Thus, the web site hierarchy is traversed to locate the correct summary file. The summary file includes one entry for each file/child directory. Each entry of the summary file identifies the name of the file/child directory, and includes a modification property, a file/folder identifier, and the length of the file. In addition, each entry may include an erasure coding packet identifier that identifies the packets that constitute the web page/file. The modification property is the timestamp at which the associated file/child directory was last updated. If the modification property is different from one peer to another peer, the items stored on the peer having the older time stamp will not be retrieved. The summary file is first checked to see whether it resides locally. The summary file will reside locally if any of the files under this directory have been previously visited by the client. When this occurs, the summary file does not need to be retrieved from the peers. Otherwise, the summary file is retrieved from one or more of the peers and stored on the local client for subsequent requests. Thus, there is a gradual cache process. The summary file itself may be broken into packets, and encoded with erasure coded messages. During retrieval, the client retrieves the erasure coded messages associated with the summary file, decodes the coded messages into packets, and reassembles the summary file. Once the summary file is available, processing continues at block 608.

At block 608, the summary files obtained from multiple peers are verified. The peer whose summary file indicates that it holds an older (i.e., earlier) version of the web page/file is not involved in the retrieval process. Once the summary file has been verified, processing continues at block 610.

At block 610, a negotiation process is performed with the available peers. The negotiation process is used to retrieve both the web page/file and the summary file described above. In one embodiment, the negotiation process will obtain the actual web site files from the available peers. In another embodiment, the negotiation process will obtain the packets that make up a web site file from the available peers. In yet another embodiment, the negotiation process will obtain messages or coded messages from the available peers. The coded messages are then decoded into packets, which are further assembled to recreate the original web page/file.

Figure 7:
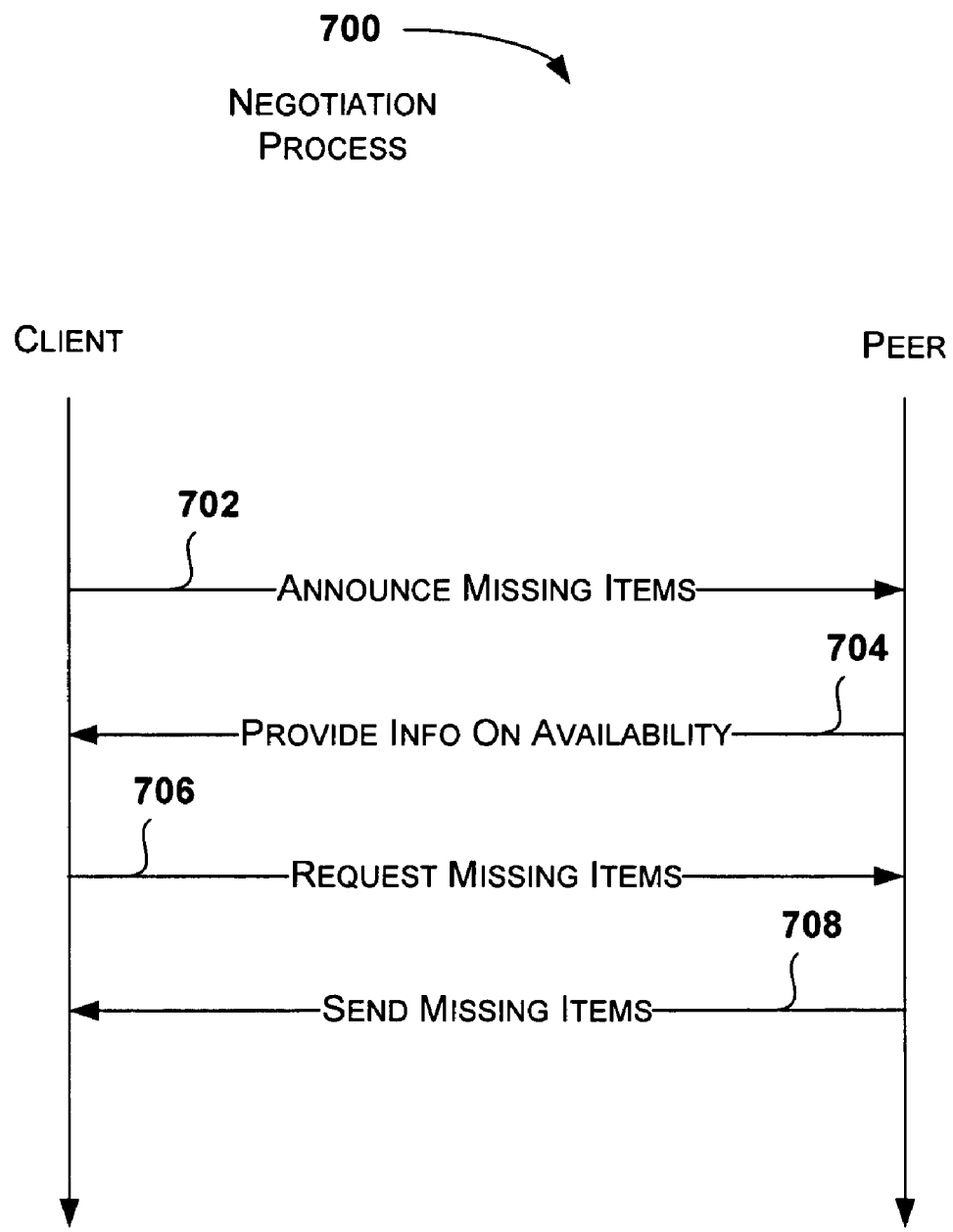
FIG. 7 is a sequential flow diagram illustrating a negotiation process for obtaining missing items suitable for use in the retrieval process shown in FIG. 6.

Turning briefly to FIG. 7, a sequential flow diagram that illustrates an exemplary negotiation process 700 for obtaining missing files or messages from the available peers is described. The term "item" is used in FIG. 7 to indicate that the requested information may be a web site file, a packet, a message, or a coded message. The left line represents communication received or transmitted from the client (i.e., the computing device that desires to see the web content and that has transmitted the URL of the distributed web site). The right line represents communication received or transmitted from one of the peers. The negotiation process 700 may be performed for each of the peers identified until the necessary items have been retrieved.

The client, via the proxy, announces which items are needed 702. If the items are coded messages, the client provides the packet identifier and the key. In response, the peer provides information regarding its available items associated with the requested missing items. Again, if the items are coded messages, the peer provides the packet identifier and the key for each coded message that is stored locally on the peer. At 706, the client sends a request for specific missing items that the peer informed were available. At 708, the peer sends the specific missing items to the client.

Returning back to FIG. 6, once the negotiation process has obtained the missing items, processing continues at block 612. At block 612, the information is assembled and the associated web page is displayed. Assembling the information may involve decoding the coded message into packets, and then assembling the packets into the specific web file associated with the URL.

Thus, as described above in conjunction with FIGS. 6 and 7, different portions of one web file may be obtained from multiple computing devices running in difference locations. Typically, none of the computing devices have a complete copy of the web file. This is particular true when erasure coding is performed. The client is then responsible for retrieving the multiple portions and piecing them together to create the requested web file and then displaying the web file in the browser.

Figure 8:
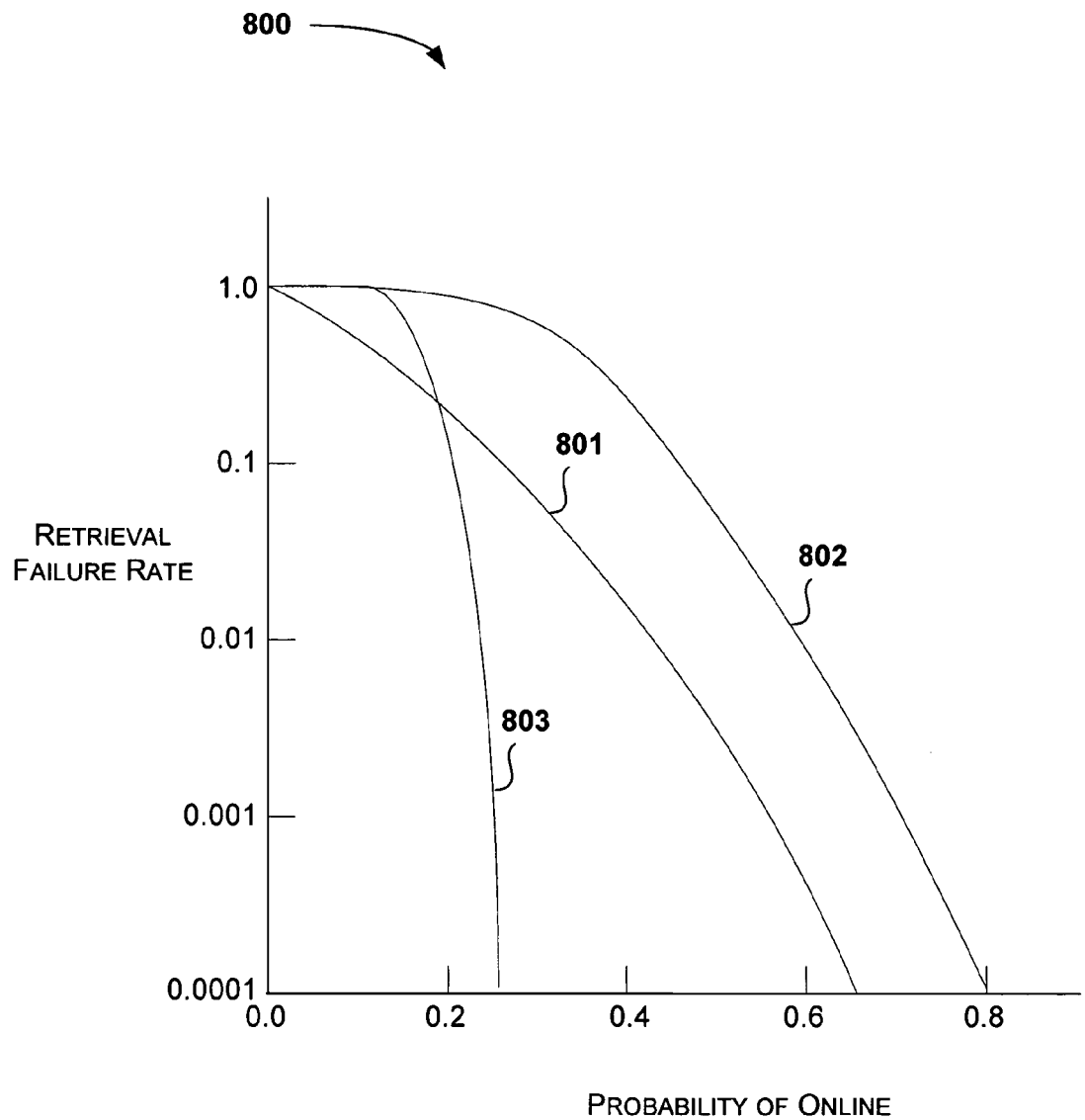
FIG. 8 is a graph illustrating test results associated with the retrieval failure rate versus the probability of being online for various scenarios.
Figure 9:
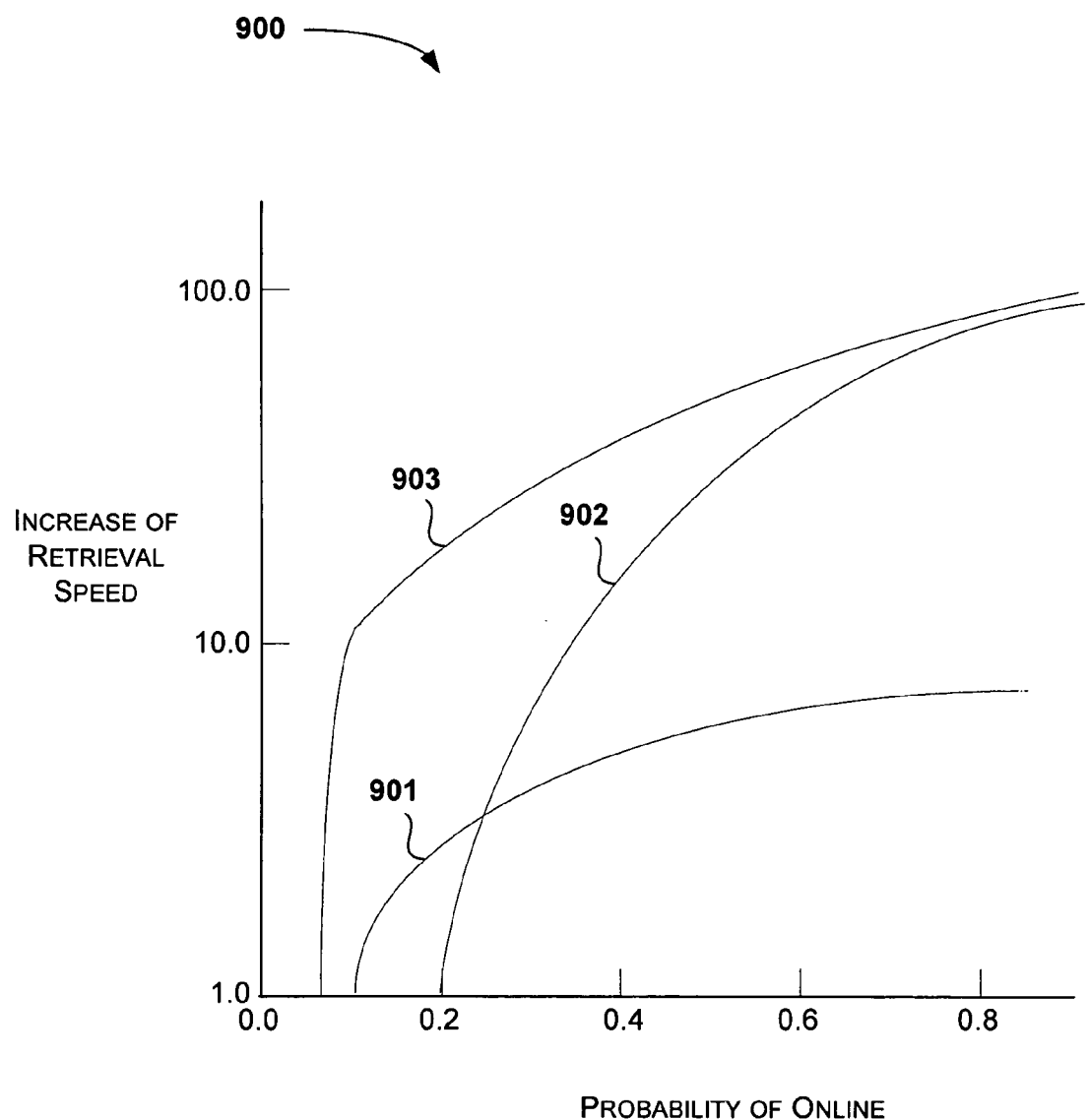
FIG. 9 is a graph illustrating test results associated with the increase of retrieval speed versus the probability of being online for various scenarios, in accordance with the present distributed web hosting mechanism.

Experiments were performed on the present distributed hosting mechanism. The experiments tested three scenarios: 1) replicating the entire web site on multiple peers; 2) replicating a portion of the web site on multiple peers without using erasure coding; and 3) replicating a portion of the web site on multiple peers using erasure coding. FIGS. 8 and 9 illustrate test results 801, 802, 803 and 901, 902, and 903, respectively, for the above three identified scenarios. For scenario 2, each packet is split into k pieces. However, during the replication stage, the original message piece is sent to the other peers without erasure coding. An assumption was made that the same amount of network and storage resources are used to distribute and host the content (i.e., the aggregated content replication ratio C) for all scenarios. Another assumption was that each of the peers in the computer cluster had an identical serving bandwidth, and had an independent probability of being online to serve the client. The probability of successfully retrieving the web site in the computer cluster (e.g., P2P network) is shown in FIG. 8. The average speed increase for retrieving the web site using the various scenarios is shown in FIG. 9. For both FIGS. 8 and 9, the horizontal axis is the probability of a peer being online. The parameter of the content distribution was set at C=8 (8 copy of content being hosted), k=16. Each of these figures is now described in further detail.

FIG. 8 is a graph illustrating test results associated with the retrieval failure rate versus the probability of being online in various scenarios. As mentioned above, curve 801 represents scenario one in which the entire web site is replicated; curve 802 represents scenario two in which a portion of the entire web site is replicated without erasure coding; and curve 803 represents scenario three in which a portion of the entire web site is replicated using erasure coding. One will note that curve 803 provides a significant improvement in the reliability of retrieval in comparison with curves 801 and 802 using the same amount of network and storage resources. In fact, once the probability that a peer was online was greater than 0.13, the rate of failure to retrieve the web site for the erasure coded content was thousands times smaller than that of the whole web replication curve 801 and the partial web replication without erasure coding curve 802.

FIG. 9 is a graph illustrating test results associated with the increase of retrieval speed versus the probability of being online in various scenarios. As mentioned above, curve 901 represents scenario one in which the entire web site is replicated; curve 902 represents scenario two in which a portion of the entire web site is replicated without erasure coding; and curve 903 represents scenario three in which a portion of the entire web site is replicated using erasure coding. One will note that the erasure coded curve 903 provides increased retrieval speeds of around 16 times and 1-10 times faster than the whole web replication (curve 901) and the partial web replication without erasure coding (curve 902), respectively.

An exemplary P2P web hosting system with erasure coded content distribution and hierarchical content organization with unequal weight assignment was designed. The web site was replicated on seven peers. The original web site consumed 228 megabytes. During the replication, each peer agreed to host 60 megabytes of the web site, which resulted in an average replication ratio of 0.26. Since the web files were unequally weighted, the peer replication ratio for the actual web files varied from 0.25 to 1.0. During the web page retrieval, the client retrieved the web content from the seven peers simultaneously, decoded the erasure coded messages, and rendered the web page.

Thus, as described, the present distributed hosting mechanism increases the retrieval speeds for accessing web content and increases the reliability of retrieving the content. In addition, the distributed hosting mechanism reduces the amount of replicated content on each individual peer. Thus, the peers do not experience the huge expense of additional storage space or increased bandwidths. The present web hosting mechanism includes three components: the host component, the peer component, and the client component. The host component distributes the portions (i.e., subsets) of web pages/files to the peers. The peer component receives the distributed portions of the web pages/files, and then redistributes them upon request of the client. The client component coordinates the retrieval of the portions of web pages/files in the form of original messages or erasure coded messages from multiple peers. The original messages are then assembled to form the requested web pages/files. The coded messages are erasure decoded into packets, which are then assembled to form the requested web pages/files.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for distributing content of a web site among multiple computing devices within a computer cluster comprising a host computing device and one or more peer computing devices, the content comprising a plurality of files, the method comprising:

calculating a relative importance for each of the plurality of files, wherein calculating the relative importance comprises calculating a file weight (FW) based on a type weight (T) and a site weight (S) assigned to each of the plurality of files such that $FW=S \times T;$ creating a plurality of subsets of the content, the subsets being determined based on the relative importance of each of the plurality of files, wherein creating the plurality of subsets is further based on an individual replication amount specified for each computing device, the individual replication amount being based upon a storage amount on the computing device for holding one of the subsets and is determined by:

$$D(\lambda i) = \sum_m |Pm| \max(1, FWm \times \lambda i),$$

where $D(\lambda_i)$ represents a total amount to be replicated to a peer computing device i, $\lambda_i$ represents the file weight for an mth file of the web site and Pm represents a file size of the mth file of the web site; and distributing one of the plurality of subsets to each of the multiple computing devices.

2. The method of claim 1, wherein the computer cluster comprises a server array.

3. The method of claim 1, wherein the computer cluster comprises a peer-to-peer network.

4. The method of claim 1, wherein the type weight is based on a file extension.

5. The method of claim 1, wherein the site weight is assigned to a directory with each file within the directory having the site weight of the directory.

6. The method of claim 5, wherein a sub-directory of the directory inherits the site weight assigned to the directory.

7. The method of claim 1, wherein the plurality of files is divided into a plurality of messages, and each subset includes at least one message.

8. The method of claim 7, wherein a majority of the plurality of messages are a fixed size.

9. The method of claim 1, further comprising dividing the plurality of files into a plurality of original messages, applying an erasure coding scheme to derive a plurality of coded messages, and adding one or more of the coded messages into each subset.

10. The method of claim 9, wherein the erasure coding scheme comprises a Reed-Solomon codec.

11. The method of claim 9, wherein distributing one of the plurality of subsets comprises distributing the subset based on a key associated with the erasure coding scheme.

12. A computer-readable storage medium having computer-executable instructions stored thereon for performing the processing recited in claim 1.

13. A system comprising: a processor; and a memory into which a plurality of instructions are loaded, the plurality of instructions performing a method comprising:

assigning a type weight to a file associated with a web site; assigning a site weight to the file;

calculating a file weight for the file based on the type weight and the site weight;

calculating a replication ratio for the file, wherein the replication ratio is determined by:

$$wm,i = \max\{1, FWm \times \lambda i\},$$

where $w_{m,i}$ represents a peer replication ratio for a mth file for a peer i, $\lambda_i$ represents a peer replication factor calculated for the peer i and $FW_m$ represents the file weight for the mth file in the web site; and sending the file to one of a plurality of computing devices based on the replication ratio.

14. The system of claim 13, further comprising splitting the file into a plurality of messages, and wherein sending the file comprises sending at least one of the plurality of messages associated with the file to the one computing device.

15. The system of claim 14, further comprising applying an erasure coding scheme to derive a plurality of coded messages, the coded messages being the messages.

* * * * *